Nov. 4, 1969  G. R. BACHAND  3,476,919
MAGNETICALLY SETTABLE COUNTER
Filed Nov. 16, 1965  3 Sheets-Sheet 1

INVENTOR.
Gordon R. Bachand
BY

Attorney

Nov. 4, 1969

G. R. BACHAND 3,476,919

MAGNETICALLY SETTABLE COUNTER

Filed Nov. 16, 1965

INVENTOR.
Gordon R. Bachand
BY

Attorney

INVENTOR.
Gordon R. Bachand

Attorney

United States Patent Office

3,476,919
Patented Nov. 4, 1969

3,476,919
MAGNETICALLY SETTABLE COUNTER
Gordon R. Bachand, Albuquerque, N. Mex., assignor to the United States of America as represented by the United States Atomic Energy Commission
Filed Nov. 16, 1965, Ser. No. 508,171
Int. Cl. G06f 7/38, 7/00
U.S. Cl. 235—92                                                5 Claims

ABSTRACT OF THE DISCLOSURE

A magnetic counting device including a magnetizable medium, input means disposed adjacent the medium for establishing magnetic domains in the medium, means for positioning the input means in magnetic proximity separately to a plurality of selective locations along the medium, means for propagating domains along the medium and output means for detecting the passing of any domains.

---

Figure 1:
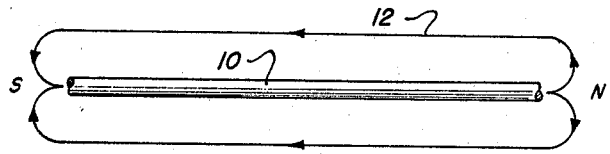

This invention relates to a counting mechanism and more particularly to a magnetically settable counter or shift register utilizing the moving magnetic domain principle.

A uniformly magnetized medium may be considered as capable of being divided into a predetermined number of discrete zones, each capable of having its magnetic field reversed, thus establishing an inherently stable reverse domain the length of which is equal to that of the discrete zone. The reverse domain may be propagated along the medium by magnetic fields whose strength is not sufficient to establish a reverse domain but is nevertheless strong enough to cause a reverse domain, once established, to move along the medium. Output means may sense the passing of the domain and an output pulse may result therefrom. The output pulse may be considered as a function of the distance from the output means to the location at which the domain was initially established. Thus, for example, if a uniformly magnetized medium may be considered as having one hundred discrete positions at which an inherently stable reverse domain may be established, and such a domain is selectively established thirty positions from the end of the medium, it follows that propagating the domain along the thirty positions will result in an output pulse which may be deemed as a count of thirty. With one hundred positions available for establishing a domain, the apparatus as illustrated may therefore be considered as having the capability of selectively counting from one to one hundred.

This device propagates a magnetic domain along a uniformly magnetized medium. The movement of the domain through or by a read coil is sensed and counted as an output signal. Since the establishment or writing of the domain, its propagation, and its sensing or reading, is accomplished entirely by magnetic fields, there are thus no ohmic switching or sliding contacts involved in the counter. With no impedance values which could change, with time and usage, as in electrical switching, the reliability and accuracy of the device is high. The device operates on a digital rather than on an analog principle and calibration is therefore unnecessary.

While the novel device herein described is referred to as a counter, it is understood that it has many other useful applications. For example, it may be used as a timer, where a predetermined time interval is desired between activation of clock means associated with the propagation of the domain and the output signal or pulse from the device. It may be used as a variable frequency divider, wherein a given frequency may be divided by any number corresponding to the predetermined number of discrete domains able to be established on the magnetic medium. The device may be used to drive another similar device, thus cascading the time, count, etc., or it may recirculate its output pulse to provide a recirculation mode. Other uses or applications of the device may be brought to mind as one reads this specification.

It is an object of this invention to provide a magnetically settable counter.

It is another object of this invention to provide a non-ohmic method (devoid of electrical switching) of setting a counter.

It is another object to provide a counter which utilizes the moving magnetic domain principle of operation.

This specification, including the description, drawing, and claims, has been prepared in accordance with the applicable patent laws, and the rules promulgated under the authority thereof.

Figure 2:
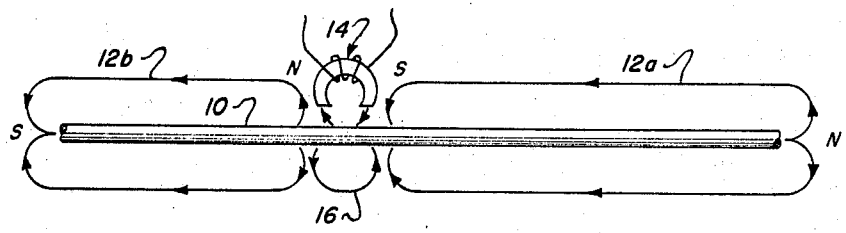
Figure 3:
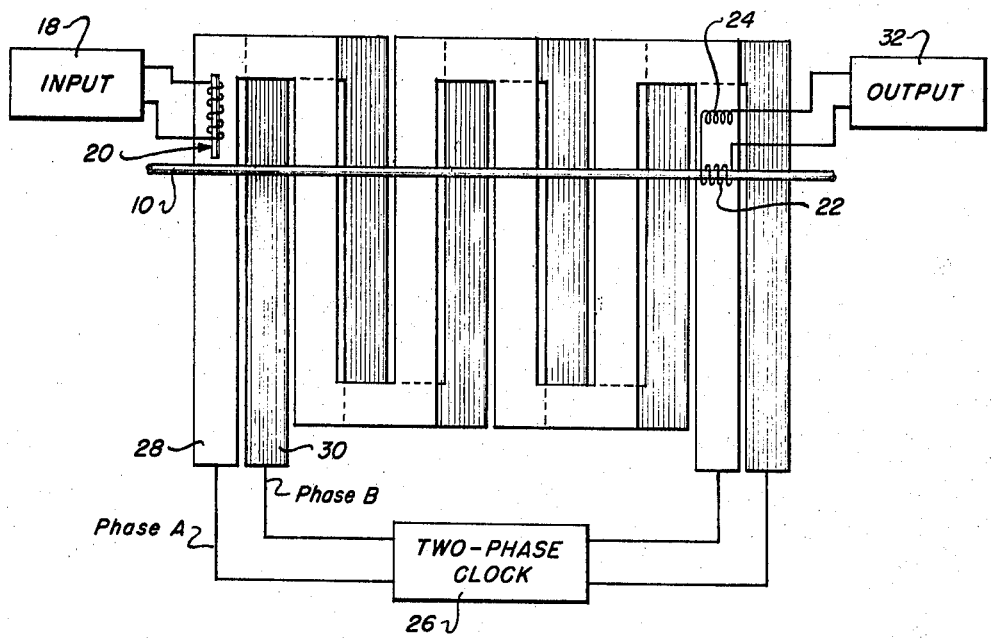
Figure 4:
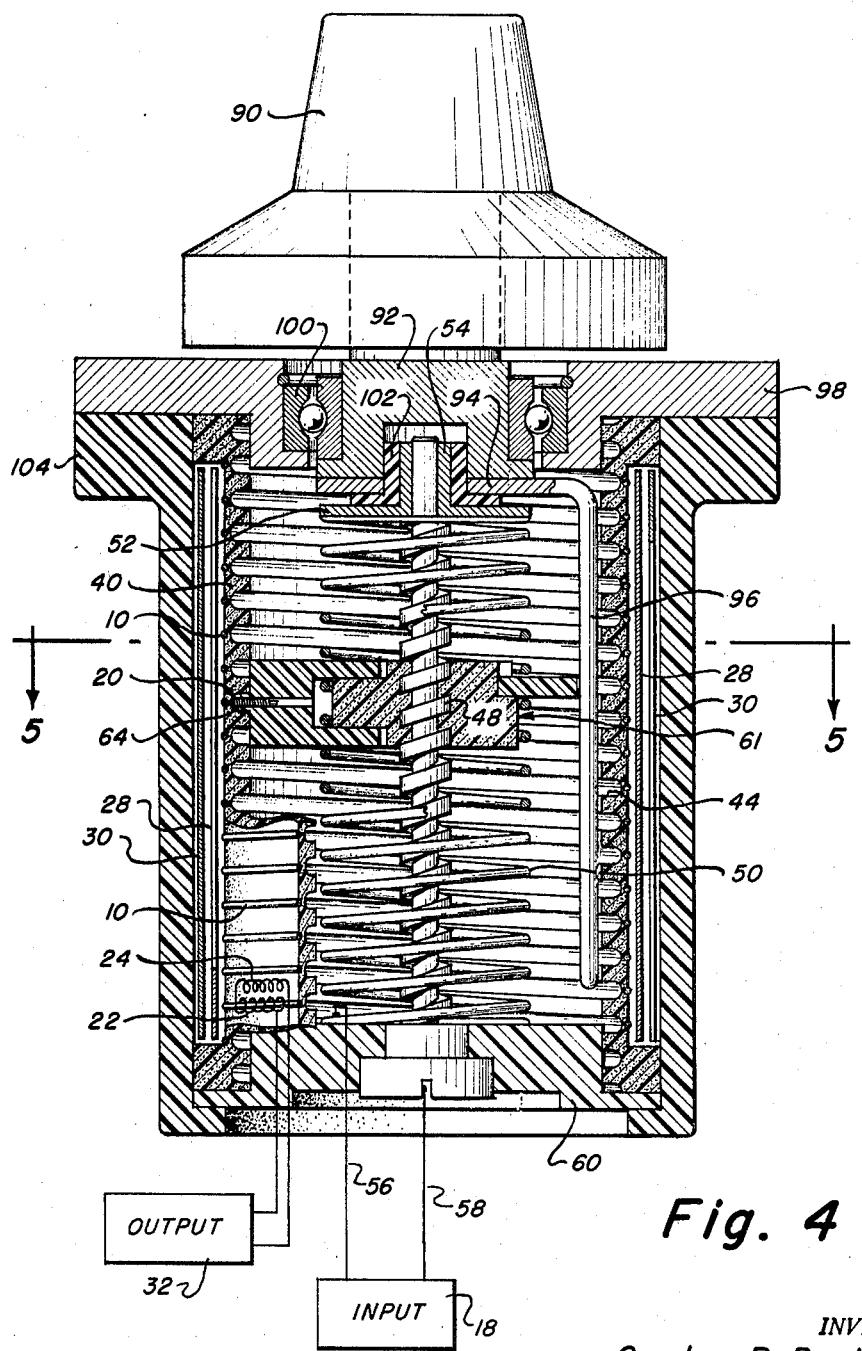
Figure 7:
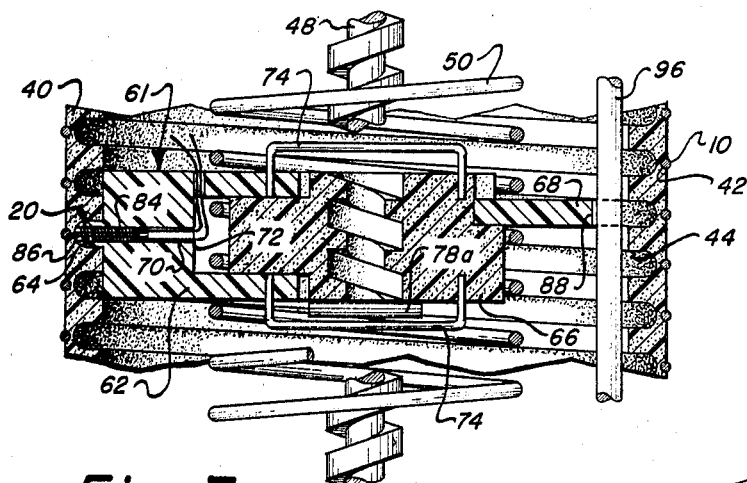
Figure 6:
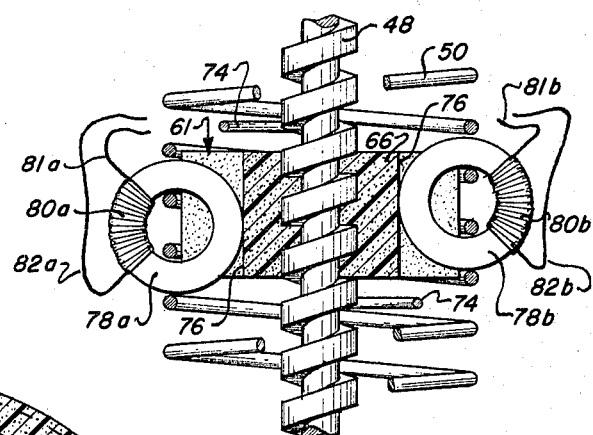
Figure 5:
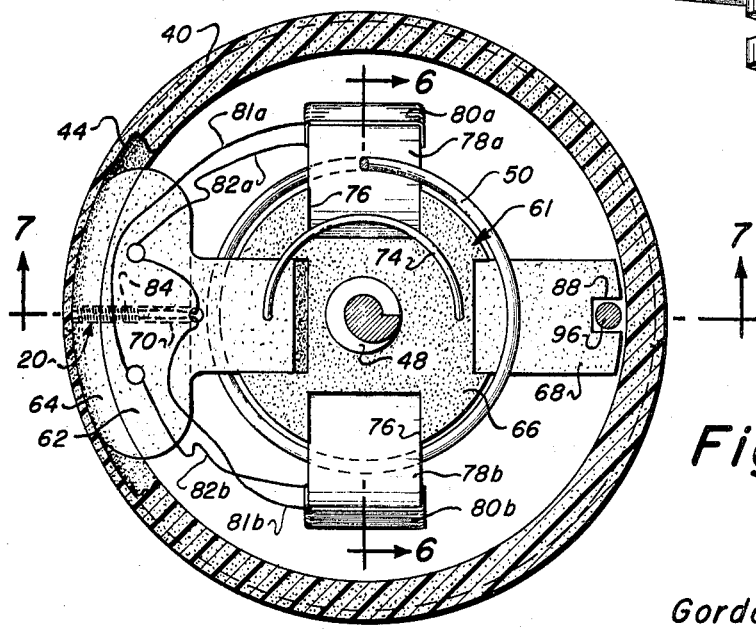

FIGS. 1 and 2 illustrate the magnetic domain principle;
FIG. 3 diagrammatically represents a moving magnetic domain counter;
FIG. 4 is a sectional view of the invention;
FIG. 5 is a view taken generally along 5—5 of FIG. 4, omitting the housing and other details;
FIG. 6 is a view taken generally along 6—6 of FIG. 5; and
FIG. 7 is a view taken generally along 7—7 of FIG. 5.

This invention is based upon the magnetic domain principle illustrated in FIGS. 1 and 2. A magnetic medium 10, such as a magnetic wire under tension, may be uniformly magnetized, as shown in FIG. 1, to provide a magnetic field 12.

If a current is passed through an input coil assembly 14 comprising a coil wound on a suitable core, such as a horseshoe magnet, and the assembly is brought into magnetic proximity with the medium 10, a magnetic domain corresponding to the field of the assembly 14, which would be opposite to the polarity of the field of medium 10, would be established as shown in FIG. 2. The original magnetic field 12 would separate into two fields, 12a and 12b, both of the same polarity as field 12, and a new field 16, of opposite polarity, would be created between fields 12a and 12b. This new field or domain 16 would coexist with fields 12a and 12b, separated from them by a domain wall at each end of the newly established domain. The minimum length of an inherently stable domain varies with the magnetic characteristics and size of the medium in which it is established. For example, a domain, to be inherently stable in a particular one mil nickel-iron wire, should have a length of at least about .125 inch (⅛ inch).

If the domain is moved along the medium, it may be seen that a coil may be used to detect or sense its passing. FIG. 3 illustrates how this may be accomplished. A uniformly magnetized medium 10 may have a reverse domain established upon a signal from input means 18 through a movable write or nucleation coil 20 in magnetic proximity to medium 10 and may have fixed sense or read coil 22 also in magnetic proximity thereto. The means for propagating the domain along the medium may comprise a two-phase clock 26 connected to propagating conductors 28 and 30. The propagating conductors 28 and 30 may overlap each other as shown, and may be insulated from each other and from the medium 10 by a suitable thin dielectric film such as "Mylar."

The field pattern generated by the pair of propagating conductors 28 and 30 would consist of alternating or interlaced positive and negative polarity induced fields. Each time the clock provides a current pulse to the conductors, the fields, as described, are generated and each succeeding pulse sequence changes the direction of the fields. Thus the polarity of phase A and phase B alternates in accordance with the pulse repetition rate of the two-phase clock 26. The pair of two-phase drive currents propagate the reverse domain toward one end of medium 10 means of their cyclic moving fields, which appear to shift one conductor width every quarter cycle. From the above description of the moving magnetic domain it may be seen that the time required for the reverse domain to reach the end of the medium will depend on the distance which it must travel and the pulse repetition rate of the two-phase clock.

The output signal, generated by the reverse domain, may be picked up by output means 32 which may include read or sense coil 22 and bucking coil 24. The two coils 22 and 24 are oppositely wound and thus cancel out the signal or current generated by the changing field of the propagating conductor over which they lie, or with which they are in magnetic proximity. The only signal that may be fed into output device 32 would therefore be that signal generated by the domain wall moving through sense coil 22 since no signal would be generated in the bucking coil 24 by the moving domain.

It may readily be seen that for a given polarity of the magnetized medium 10, the direction of the field generated by the write coil 20 must be opposite in sense in order to create a reverse domain. Moreover, since the propagating conductors reverse polarity with each cycle, the polarity and field pattern generated by the conductors is favorable to the establishment of a reverse domain only once each cycle for any one propagating conductor pair. Hence, while the signal from write coil 20 may be synchronized with either phase A or phase B of conductors 28 or 30, once a particular conductor pair is chosen, the coil 20 should thereafter be positioned adjacent to the same pair in order to create a reverse domain. The reverse domain is established or nucleated by sending a current, as from a capacitor, through the nucleation coil when adjacent conductor strips are of the same polarity, and their field is reversed from that of the medium. The addition of the field strength of the coil to that of the conductor pair is then sufficient to penetrate a nucleation and establish a stable domain whose length is about the width of the two conductor strips.

According to the above description there are two variables in the counting sequence. The first variable is the original placement of the reverse domain. Since the output signal is determined by the voltage induced in the read coil 22 by the passing of the moving domain, it may be seen that a domain placed on magnetic medium 10 either closer to or farther from the read coil 22 will decrease or increase the time between the writing and the reading of the domain and consequently the number of pulses required to move the domain to the read coil will vary accordingly. The latter feature, of course, is the actual counting procedure or process.

The second variable is the frequency at which the two-phase clock operates. While the number of counts is independent of the frequency and is dependent only on the placement of the domain, the frequency of the pulses directly affects the time involved in the counting sequence. Thus decreasing the frequency or rate of pulses will increase or lengthen the counting time but will not increase the total counts, and increasing the frequency of the pulse repetitions will decrease the elapsed time but will again have no effect on the number of pulses counted.

FIG. 4 is a sectional view of the present invention embodying the concepts discussed above. A uniformly magnetized medium 10 which may be 1 mil nickel-iron wire, is preferably spirally wrapped about a cylindrical or annular substrate 40. The wire medium 10 may be secured to the substrate under tension and may be placed in a circumferentially spiraled groove 42 on the substrate. (See FIG. 7.) To prevent problems caused by temperature changes, both the wire and the substrate have approximately the same coefficient of expansion. Moreover, the substrate should not be magnetic; it may be brass or some other suitable non-magnetic metal, or a phenolic resin, impregnated for greater strength with glass fibers or the like. To increase the reliability of the device, bias magnets (not shown) may be incorporated into the device. Thus a permanent magnet may be juxtaposed to the wire 10 at each end thereof to insure that the wire medium may be uniformly magnetized.

The substrate may be internally threaded or grooved as at 44 radially opposite to and parallel with the groove 42 such that a write coil 20, suspended in a head 61 as described infra, may be maintained directly opposite the wire 10 as said movable head travels in the groove 44.

The propagating conductors 28 and 30 may be wrapped circumferentially about the substrate 40 and wire 10 and may be insulated from the wire and from each other by a thin dielectric film such as "Mylar." If desired, the conductors may be etched from a sheet of "Mylar" coated with copper on both sides. The conductor strips 28 and 30 may extend in an axial direction, generally perpendicular to the wire 10 as shown in FIG. 3. For clarity in FIGURE 4, the conductors are exaggerated and the insulation is omitted. The strips may be about one eighth inch wide, thus determining the length of the reverse domain to be about one fourth inch.

A read or sense coil 22 may be disposed about wire 10 and a bucking coil 24, wound in the opposite sense to the read coil, may be in series with said read coil and should be parallel with the read coil overlying the same propagating conductor strip. If desired, it may be understood that a read coil and bucking coil may also be situated at the opposite end of the magnetic medium, or the beginning of the medium in the directional sense used herein, and the complement of the count time as discussed herein may be determined.

A center stem 48, which may be brass or some other suitable nonmagnetic conductor, may be threaded externally with the same pitch and lead as grooves 42 and 44. Surrounding stem 48 may be a spirally or helically wound coil 50, which may be in the form of a beryllium copper spring, or some other suitable nonmagnetic conductor spring. The lead of the spring is also the same as grooves 42, 44. The spring or coil 50 may be electrically connected to the stem 48 through flange 52 of sleeve 54. Electrical leads 56 and 58 may be connected to the stem and coil, which together form a conductor path for the energizing of the write head which will be described infra. The helical coil may become the primary winding as it passes through the write head assembly 61. Both stem 48 and coil 50 may be secured to base 60, which may be of any suitable dielectric material, such as a phenolic resin, by any appropriate means.

FIGS. 5, 6 and 7 show the write head assembly in greater detail than is shown in FIG. 4. FIGS. 5 and 7 show only the substrate and the write head and do not show the housing or propagating conductors. FIG. 6, as indicated by the section lines in FIG. 5, shows only the rotor, cores, coils and shaft. The following description of the write head 61 may best be understood from referring to FIGS. 5, 6 and 7.

The write head 61 may comprise a head mount 62, a rotor 66, and a torque arm 68, each of which may be of "Teflon," "nylon," or some other suitable nonmagnetic, nonconducting material, preferably having self-lubricating properties. Both head mount 62 and torque arm 68 may be received in mating slots in the rotor 66. The head mount 62 preferably includes a ridge 64 adapted to move in groove 44 of substrate 40, and a radial bore 70, communicating with slot 72 and extending through the head and ridge, and adapted to receive nucleation or solenoid coil 20.

The rotor 66 may be internally threaded to receive the threads of stem 48 and thereby move coaxially on the stem as it rotates about the said stem. Head mount 62 may be secured to rotor 66 by a pair of springs 74 which may also provide tension to retain ridge 64 in groove 44. It may be noted that springs 74 have been omitted from FIG. 4 for clarity. Diametrically opposed slots 76 in the rotor may receive toroidal cores 78 having secondary windings 80 thereon. The cores may be held in the slots by any appropriate manner as by potting (not shown). The windings may be connected in series with each other to increase the induced voltage through the windings 84 about the ferrite core 86 of the nucleation coil 20. As shown in FIG. 5, top lead 81a from windings 80a is connected to bottom lead 82b from windings 80b. Bottom lead 82a from windings 80a goes directly to one end of windings 84 of nucleation coil 20 and top lead 81b from windings 80b goes directly to the other end of windings 84. Two turns of the coil 50 may be threaded through the cores and through slot 72 and may comprise the primary windings.

Torque arm 68 may include a slot 88 adapted to receive shaft 96, and may be secured to the rotor by any suitable means. It may be seen that rotation of the shaft 96 will provide corresponding rotation of the rotor and thus the write head assembly, and that as the head turns it moves coaxially on the threads of stem 48, carrying with it the nucleation solenoid 20 in groove 44.

As illustrated, the nucleation coil 20 may comprise a number of windings 84 about a ferrite core 86 disposed in bore 70. The nucleation coil is therefore retained in the closest possible proximity to the magnetic conductor 10.

A knob 90 may be operatively connected to the write head through yoke 92 and collar 94, a portion of which may curve down perpendicular to the collar and become shaft 96. (See FIG. 4.) Appropriate means such as pins, screws, and the like, may be used to secure the knob, yoke, and collar together. The shaft may be disposed in slot 88 in the torque arm and may serve to rotate the write head about the stem 48 to position the head as desired. The knob 90 may be supported on top plate 98 through appropriate bearing means 100 which may be supported on an interior flange of the plate and an exterior flange of the yoke and held in place by a snap ring or the like. The knob may rotate about stem 48 on appropriate bearing means 102, which may be a "Teflon" on "nylon" sleeve. A dial plate on the base of knob 90 or on top plate 98 may be used to indicate the count position of the write head. Thus an index on the knob 90 may be coordinated with the dial plate or the top plate and calibrated with the write head in an appropriate manner to indicate the position of the nucleation coil 20 in terms of count bits or domains. As discussed above, the current in the propagating conductors is only favorable for establishing a domain once every cycle and thus it is necessary to determine which conductor pair or phase, phase A or phase B, will be used with the nucleation coil 20 to establish the reverse domain. Once selected, the selection should thereafter be used in calibrating the knob and dial.

The assembly as described may be enclosed in a suitable housing 104 of any appropriate nonmagnetic material.

It may readily be seen that the number of counts or count bits possible according to applicant's invention may be limited only by the length of the medium 10. As a practical matter there are several factors which may be considered in the design of a particular counter according to this invention. For example, the length or height of the helical column, the pitch and lead of the four concentric helices, the size of the uniformly magnetized conductor, the size of the magnetic field about the conductor, the size and shape of the write head and the nucleation coil therein, the width of the propagating conductors, and other miscellaneous items should be given careful consideration.

For illustrative purposes the novel counter described herein may be considered as having the capability of counting from one to one hundred. That is, there may be one hundred discrete positions along the uniformly magnetized medium at which a nucleation may be penetrated to establish a reverse domain. This domain may be propagated along the medium by means of a two-phase clock and a pair of propagating conductors. The propagating conductors, whose strips may alternate in both position and polarity, may cause the domain to advance along the medium in accordance with the fields generated about the conductor strips. The clock, connected to the two conductors, preferably may be a two-phase generator, the output of which may be of substantially square wave form with a 90° phase shift. The alternating fields thus advance the domain one strip width each quarter cycle. Hence, in one cycle the domain is propogated a distance equal to the width of four strips.

The nucleation coil, held in the head mount, is positioned adjacent the magnetized medium at the desired count interval. For example, if a count of thirty is desired, the write head is raised or lowered along the central stem by turning the knob. When the numeral "30" is indexed at the knob, the write head is in position to penetrate a nucleation and establish a reverse domain on the magnetized medium. During the propitious time of a clock cycle, when an adjacent propagating conductor pair opposite the solenoid or nucleation coil in the write head are of the same polarity, opposite to that of the magnetized medium or wire, the solenoid may be energized as by the discharge of a capacitor through the spring coil, which acts as a primary winding for the tape coupling cores in the write head assembly and induces a voltage in the secondary windings which in turn provides a current through the windings about the ferrite core of the nucleation coil. The field thus resulting from the latter coil and the conductors is sufficient to penetrate a nucleation and establish a stable domain, the length of which is the width of the two adjacent conductor strips. The reversing polarity of the propagating conductors causes the magnetic fields about the strips to change, and as the fields shift, the domain also shifts. The shifting thus propagates the domain along the medium.

The changing field of the conductor strip associated with the output means induces a voltage in both the read coil and the bucking coil. The coils, wound in opposite directions may effectively cancel out this induced voltage. As the domain wall passes through the read coil, which is preferably wound about the magnetic wire medium as shown in FIG. 4, a voltage is induced which is not induced in the bucking coil because the latter is not within the field of the magnetic medium. This induced voltage provides an output signal, which in this illustration has resulted from the propagation of a domain by thirty cycles or sixty pulse repetitions of the two-phase clock. The time involved between output pulses may be controlled by varying the number of pulses or cycles counted and by varying the pulse repetition rate. If, for example, the two-phase clock is set for a one second cycle and the count set for "30," it follows that an output pulse will occur thirty seconds after initiation of the clock.

It will thus be seen that applicant's device provides a novel counting means devoid of ohmic limitations and liabilities inherent in electrical switching and a device which is efficient and highly reliable due to the magnetic principles upon which this invention is based.

I claim:

1. A magnetic counting device comprising, in combination, an annular substrate having interiorly disposed helical groove means, a helical medium uniformly magnetized in one direction and disposed circumferentially about said substrate generally parallel to and adjacent with said helical groove means, movable input means rotatably secured inside said substrate with at least a portion thereof disposed in said groove means for establishing reverse magnetic domains in said medium at a plurality of selective locations, means for propagating said domains along said medium including a pair of propagating conductors disposed generally perpendicular to and in magnetic proximity with said medium and a two-phase clock for alternating the polarity of the said conductors, and coil means in magnetic proximity to said magnetized medium for detecting the passing of the reverse domains.

2. The device of claim 1 in which the said input means comprises a nucleation coil radially disposed inside said annular substrate in magnetic proximity to said medium.

3. The device of claim 2 in which the input means further comprises a stem having helical threads thereon corresponding to the pitch and lead of the magnetized medium, helical coil means concentric with said stem having the same pitch and lead as said stem, said stem and said coil means being electrically connected in series with each other, a rotatable write head assembly internally threaded and adapted to engage the threads on the stem and to move on said threads, means for rotating said write head assembly, and means for forming a pulse in said stem and coil means.

4. The device of claim 3 in which the write head assembly includes a ridge adapted to move in said interiorly disposed groove, and a bore radially aligned in said head and said ridge adapted to receive said nucleation coil therein and to maintain said coil in magnetic proximity with said medium.

5. The device of claim 4 in which the write head further includes a plurality of magnetic cores having windings thereon, diametrically opposed slots for receiving said cores, apertures in said cores adapted to receive said coil means, leads extending from said windings and connected together and to said nucleation coil in a series relationship, and another slot in said head adapted to receive said coil means.

References Cited
UNITED STATES PATENTS

| | | |
|---|---|---|
| 3,137,845 | 6/1964 | Synder. |
| 3,334,343 | 8/1967 | Synder. |
| 3,366,936 | 1/1968 | Synder. |
| 3,370,280 | 2/1968 | Tickle. |
| 2,846,654 | 8/1965 | Epstein et al. _____ 333—30 |
| 3,387,284 | 6/1969 | Munson et al. _____ 340—173 |

MAYNARD R. WILBUR, Primary Examiner

J. M. THESZ, Assistant Examiner

U.S. Cl. X.R.

328—27; 340—174